(12) United States Patent
Trudeau

(10) Patent No.: US 9,039,831 B2
(45) Date of Patent: May 26, 2015

(54) NON-AQUEOUS RAPID SETTING DRYWALL COMPOUND AND METHOD OF USE

(71) Applicant: Walter Trudeau, Jacksonville, FL (US)

(72) Inventor: Walter Trudeau, Jacksonville, FL (US)

(*) Notice: Subject to any disclaimer, the term of this patent is extended or adjusted under 35 U.S.C. 154(b) by 351 days.

(21) Appl. No.: 13/668,765

(22) Filed: Nov. 5, 2012

(65) Prior Publication Data

US 2014/0123591 A1 May 8, 2014

(51) Int. Cl.
| | |
|---|---|
| *C04B 11/00* | (2006.01) |
| *C04B 28/14* | (2006.01) |
| *E04G 23/02* | (2006.01) |
| *C04B 26/06* | (2006.01) |
| *C04B 103/10* | (2006.01) |

(52) U.S. Cl.
CPC ............... *C04B 28/14* (2013.01); *E04G 23/02* (2013.01); *C04B 26/06* (2013.01); *C04B 2103/10* (2013.01)

(58) Field of Classification Search
CPC ........................................ C04B 11/00
USPC ................................................... 106/778, 772
See application file for complete search history.

(56) References Cited

U.S. PATENT DOCUMENTS

| | | |
|---|---|---|
| 3,297,601 A | 1/1967 | Maynard et al. |
| 3,984,269 A | 10/1976 | Schneller et al. |
| 5,709,743 A | 1/1998 | Leture et al. |
| 5,746,822 A | 5/1998 | Espinoza et al. |
| 6,379,458 B1 | 4/2002 | Immordino et al. |
| 6,676,746 B2 | 1/2004 | Langford |

*Primary Examiner* — Paul Marcanton
(74) *Attorney, Agent, or Firm* — Thomas C. Saitta

(57) ABSTRACT

A non-aqueous drywall compound being the combination of a first component mixture of acetone, a non-aqueous liquid adhesive containing ethyl cyanoacrylate, and a powder containing calcium sulfate hemihydrate (plaster of Paris), the mixture being a pliable putty capable of adhering to gypsum wallboard or similar work surfaces. The second component of the drywall compound is an accelerator or activator containing acetone and toluene. The first component is applied to a defect in a work surface using a spreading tool and the second component is then applied to the exposed surface of the first component, such as by spraying or brushing, whereupon the drywall compound cures, hardens or sets within less than ten minutes to a state capable of being sanded into a smooth, hard surface and painted.

20 Claims, 1 Drawing Sheet

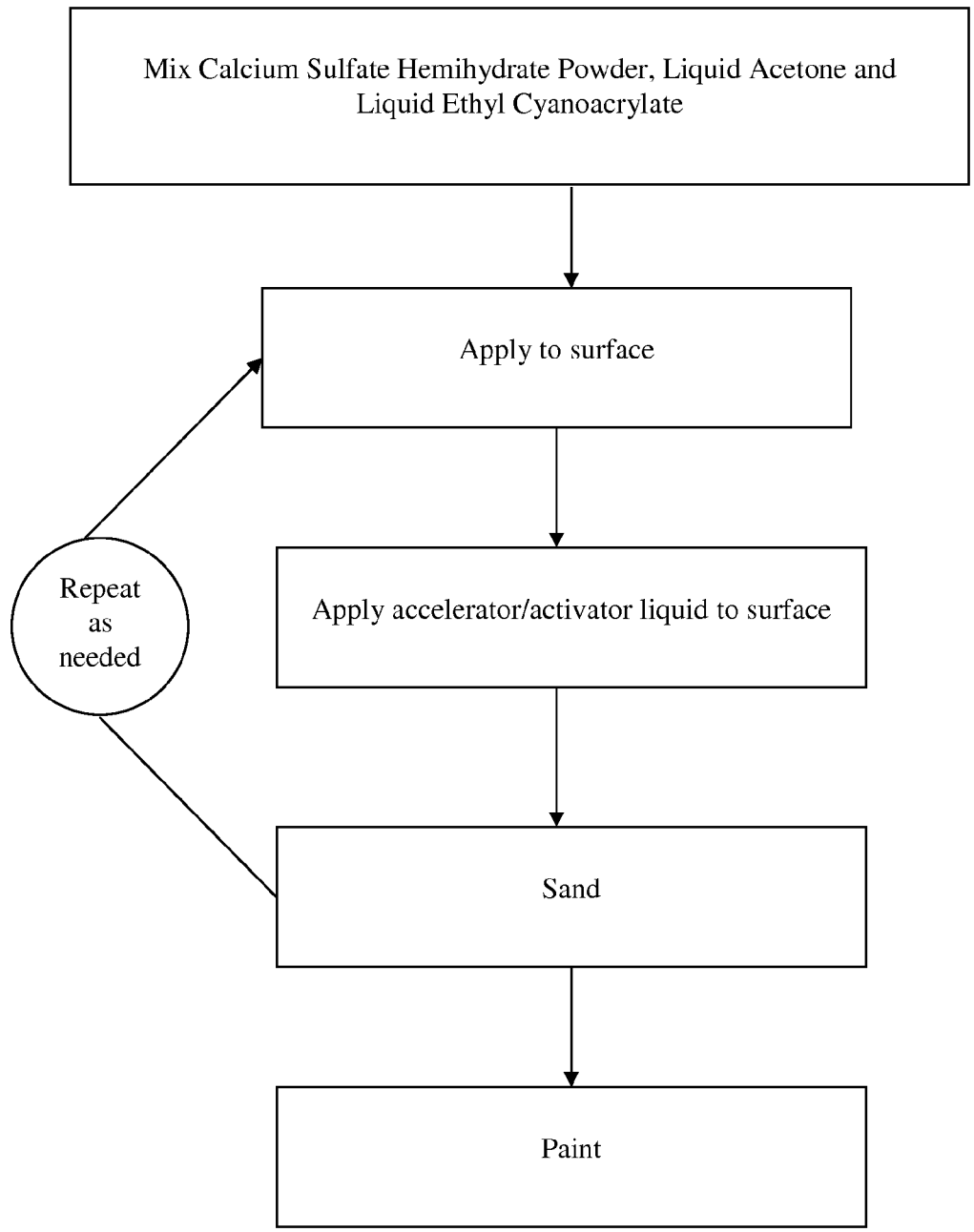

NON-AQUEOUS RAPID SETTING DRYWALL COMPOUND AND METHOD OF USE

BACKGROUND OF THE INVENTION

This invention relates generally to the field of drywall compounds, also known as joint compounds, wall repair compounds, taping compounds, or mud, typically used to conceal joints or repair defects in gypsum wallboard panels. More particularly, this invention relates to a rapid setting compound and method of application, wherein the compound is applied in a pliable putty form and then rapidly cures or hardens to create a surface that conceals the joints or defects and can be sanded and painted.

Known drywall compounds typically include a filler material and a binder that are mixed with water. Conventional fillers include calcium carbonate, calcium sulfate dehydrate (gypsum) and calcium sulfate hemihydrate (plaster of Paris), and are provided as pre-mixed compounds (water already added) or setting-type compounds (dry powders to which water is added on site). The compound is applied to the drywall panels using a trowel, putty knife or similar tool, is allowed to harden and then sanded, successive coats are applied as needed, each coat being allowed to harden and sanded before the next coat is applied, then painted. Curing or setting time after application to the surface is an important factor to optimize, with faster curing times being desirable, especially in repair situations. Conversely, the compound cannot cure too rapidly, as this precludes preparing large batches of wet compound which would then harden before it can be applied. Most commercial drywall compound products have a cure time of 4 to 8 hours, although some faster setting compounds will cure in 1 to 2 hours. Even this shorter cure time is not optimal for spot applications, such as might be performed in response to a builder's punch list in new construction or by a homeowner in making a repair.

It is an object of this invention to provide a drywall compound and method of application wherein the compound remains pliable for several hours after preparation yet cures within minutes after application to a create a hard body and surface that is able to be sanded and painted, or to receive successive coats of compound as required to build a thicker body.

SUMMARY OF THE INVENTION

The invention is a non-aqueous drywall compound, also known as joint compounds, wall repair compounds, taping compounds, or mud, used to conceal joints or repair defects in gypsum wallboard or similar panels, as well as the method of use of the drywall compound. The compound is the combination of a non-aqueous first component applied in a pliable putty form to a surface and an accelerator or activator component, also non-aqueous, applied to the surface of the first mixture, whereby the compound then cures or hardens within minutes to create a surface that can be sanded into a smooth, hard surface to receive successive layers of the compound or to be painted.

The first component of the drywall compound is the non-aqueous mixture of acetone, a liquid primarily comprising ethyl cyanoacrylate, and a powder primarily comprising calcium sulfate hemihydrate (plaster of Paris), the mixture being a pliable putty capable of adhering to gypsum wallboard or similar panels. The second component of the drywall compound is an accelerator or activator primarily comprising acetone and further comprising toluene. The first component is applied to a surface using a spreading tool and the second component is then applied to the surface of the first component, such as by spraying or brushing, whereupon the drywall compound cures, hardens or sets into a rigid, sandable, paintable solid within less than ten minutes.

BRIEF DESCRIPTION OF THE DRAWINGS

FIG. 1 is a flow chart illustrating an embodiment of the method steps of the invention.

DETAILED DESCRIPTION OF THE INVENTION

The invention is a non-aqueous drywall compound, also known as joint compounds, wall repair compounds, taping compounds, or mud, used to conceal joints or repair defects in gypsum wallboard or similar panels, as well as the method of use of the drywall compound. The compound is the combination of a non-aqueous first component applied in a pliable putty form to a surface and an accelerator or activator component, also non-aqueous, applied to the surface of the first mixture, whereby the compound then cures or hardens within minutes to create a rigid solid having a surface that can be sanded into a smooth, hard surface to receive successive layers of the compound or be painted.

As used herein, the term "non-aqueous" shall define a compound formed as a mixture of particular compositions (in dry powder and liquid form) with no water being added to the mixture of compositions to facilitate mixing, blending, spreading, etc. to create the first component as defined below. The term as used herein does not preclude water chemically combined with other substances in order to form a particular composition of the mixture, such as for example the water chemically bonded within the dry powder calcium sulfate hemihydrate ($CaSO_4 \cdot \tfrac{1}{2}H_2O$).

The first component of the drywall compound is the non-aqueous mixture of (a) acetone, (b) a liquid primarily comprising ethyl cyanoacrylate, and (c) a powder primarily comprising calcium sulfate hemihydrate (plaster of Paris), the mixture being a pliable putty capable of adhering to gypsum wallboard or similar panels. The second component of the non-aqueous drywall compound is a non-aqueous accelerator (or activator) primarily comprising acetone and further comprising toluene. The first component is applied to a work surface or object and the second component is then applied to the exposed surface of the first component, whereupon the drywall compound cures, hardens or sets within less than ten minutes.

In a broad embodiment, the first component of the non-aqueous drywall compound comprises (a) acetone, (b) a liquid primarily comprising ethyl cyanoacrylate and further comprising poly-methyl-methacrylate and hydroquinone, and (c) a powder primarily comprising calcium sulfate hemihydrate (plaster of Paris) and further comprising one or more composition chosen from the group of compositions consisting of limestone, dolomite, expanded perlite, mica, a vinyl alcohol polymer, attapulgite and crystalline silica, with the second component of the non-aqueous drywall compound primarily comprising acetone and further comprising a modified toluene polymer. The first component is present at greater than 99 wt % of the non-aqueous drywall compound and the second component is present at less than 1.0 wt % of the non-aqueous drywall compound.

In a preferred embodiment, the acetone comprises or is present at approximately 32-45 wt % of the first component, the liquid primarily comprising ethyl cyanoacrylate and further comprising poly-methyl-methacrylate and hydroquinone comprises or is present at approximately 3-10 wt % of the first component, and the powder primarily comprising calcium sulfate hemihydrate (plaster of Paris) and further comprising one or more of limestone, dolomite, expanded perlite, mica, a vinyl alcohol polymer, attapulgite and crystalline silica comprises or is present at approximately 45-65 wt % of the first component.

More preferably, the acetone comprises or is present at approximately 32-41 wt % of the first component, the liquid primarily comprising ethyl cyanoacrylate and further comprising poly-methyl-methacrylate and hydroquinone comprises or is present at approximately 3-4 wt % of the first component, and the powder primarily comprising calcium sulfate hemihydrate (plaster of Paris) and further comprising one or more of limestone or dolomite, expanded perlite, mica, a vinyl alcohol polymer, attapulgite and crystalline silica comprises or is present at approximately 55-65 wt % of the first component.

Even more preferably, the acetone comprises or is present at approximately 32 wt % of the first component, the liquid primarily comprising ethyl cyanoacrylate and further comprising poly-methyl-methacrylate and hydroquinone comprises or is present at approximately 3 wt % of the first component, and the powder primarily comprising calcium sulfate hemihydrate (plaster of Paris) and further comprising one or more of limestone, dolomite, expanded perlite, mica, a vinyl alcohol polymer, attapulgite and crystalline silica comprises or is present at approximately 65 wt % of the first component.

In another embodiment, the first component of the non-aqueous drywall compound comprises (a) acetone, (b) a liquid comprising approximately 90-95 wt % ethyl cyanoacrylate, approximately 5-10 wt % poly-methyl-methacrylate and approximately 0.1-0.5 wt % hydroquinone (such as for example a liquid adhesive product sold under the brand name RITE-LOK SI100 by FastCap, LLC), and (c) a powder comprising approximately 60-70 wt % calcium sulfate hemihydrate (plaster of Paris), less than 10 wt % limestone or dolomite, less than 10 wt % expanded perlite, less than 10 wt % mica, less than 5 wt % of a vinyl alcohol polymer, less than 5 wt % attapulgite and less than 5 wt % crystalline silica (such as for example a product sold under the brand name SHEETROCK LIGHTWEIGHT SETTING-TYPE JOINT COMPOUNDS EASY SAND 20 by United States Gypsum Co.). The second component of the non-aqueous drywall compound comprising approximately 90-95 wt % acetone and approximately 5-50 wt % of modified toluene polymer (such as for example a product sold under the brand name 2P-10 ACTIVATOR by FastCap, LLC).

As a representative example, the first component of the non-aqueous drywall compound may comprise approximately 40 grams of plaster of Paris in powder form, approximately 20 to 40 grams of liquid acetone, and approximately 3 to 9 grams of liquid adhesive mainly comprising ethyl cyanoacrylate, with the second component of the non-aqueous drywall compound comprising less than 0.5 grams of a non-aqueous accelerator.

Upon mixing the first component of the non-aqueous drywall compound to a putty consistency, the first component will remain useable for several hours. The first component is applied to a work surface or object using a putty knife or other spreader tool to fill in or cover joints, correct defects, etc. The second component is then sprayed, brushed, rolled, poured or otherwise applied to the exposed surface of the first compound using suitable applicator equipment, whereupon curing, setting or hardening to a consistency able to be sanded into a smooth, hard surface occurs within less than ten minutes, and with the most preferred ratio of components as set forth above, within approximately 5 to 6 minutes. If needed, another layer of the first component is applied to the cured drywall compound, before or after sanding the exposed surface of the cured drywall compound, and the second component is then applied to this additional coating layer, then sanded if needed after setting. Multiple coatings may be applied as needed. The non-aqueous drywall compound may be sanded into a smooth, hard surface, painted or otherwise processed a soon as it has cured, i.e., within less than ten minutes.

It is understood and contemplated that equivalents and substitutions for the elements and steps described above may be obvious to those of ordinary skill in the art, and therefore the true scope and definition of the application is to be as set forth in the following claims.

I claim:

1. A non-aqueous drywall compound comprising the combination of a first component and a second component;
   said first component comprising the non-aqueous mixture of (a) acetone, (b) a liquid primarily comprising ethyl cyanoacrylate, and (c) a powder primarily comprising calcium sulfate hemihydrate, the mixture being a pliable putty capable of adhering to a surface;
   said second component comprising a non-aqueous accelerator primarily comprising acetone and further comprising toluene;
   whereby the combination of said first component and said second cures in less than ten minutes.

2. The drywall compound of claim 1, wherein said liquid primarily comprising ethyl cyanoacrylate further comprises poly-methyl-methacrylate and hydroquinone;
   and wherein said powder primarily comprising calcium sulfate hemihydrate further comprises one or more of the group of compositions consisting of limestone, dolomite, expanded perlite, mica, a vinyl alcohol polymer, attapulgite and crystalline silica.

3. The drywall compound of claim 2, wherein said liquid primarily comprising ethyl cyanoacrylate and further comprising poly-methyl-methacrylate and hydroquinone comprises approximately 90-95 wt % ethyl cyanoacrylate, approximately 5-10 wt % poly-methyl-methacrylate and approximately 0.1-0.5 wt % hydroquinone;
   wherein said powder primarily comprising calcium sulfate hemihydrate further comprises one or more of the group of compositions consisting of limestone, dolomite, expanded perlite, mica, a vinyl alcohol polymer, attapulgite and crystalline silica comprises approximately 60-70 wt % calcium sulfate hemihydrate, less than 10 wt % limestone or dolomite, less than 10 wt % expanded perlite, less than 10 wt % mica, less than 5 wt % of a vinyl alcohol polymer, less than 5 wt % attapulgite and less than 5 wt % crystalline;
   and wherein said second component of said non-aqueous drywall compound comprises approximately 90-95 wt % acetone and approximately 5-50 wt % modified toluene polymer.

4. The drywall compound of claim 1, wherein said first component is present in said combination at greater than 99 wt % of said drywall compound and said second component is present in said combination at less than 1.0 wt % of the said drywall compound.

5. The drywall compound of claim 1, wherein said acetone is present at approximately 32-45 wt % of said first component, said liquid primarily comprising ethyl cyanoacrylate is present at approximately 3-10 wt % of said first component, and said powder primarily comprising calcium sulfate hemihydrate is present at approximately 45-65 wt % of said first component.

6. The drywall compound of claim 1, wherein said acetone is present at approximately 32-41 wt % of said first component, said liquid primarily comprising ethyl cyanoacrylate is present at approximately 3-4 wt % of said first component, and said powder primarily comprising calcium sulfate hemihydrate is present at approximately 55-65 wt % of said first component.

7. The drywall compound of claim 1, wherein said acetone is present at approximately 32 wt % of said first component, said liquid primarily comprising ethyl cyanoacrylate is present at approximately 3 wt % of said first component, and said powder primarily comprising calcium sulfate hemihydrate is present at approximately 65 wt % of said first component.

8. The drywall compound of claim 3, wherein said first component is present in said combination at greater than 99 wt % of said drywall compound and said second component is present in said combination at less than 1.0 wt % of the said drywall compound.

9. The drywall compound of claim 3, wherein said acetone is present at approximately 32-45 wt % of said first component, said liquid primarily comprising ethyl cyanoacrylate is present at approximately 3-10 wt % of said first component, and said powder primarily comprising calcium sulfate hemihydrate is present at approximately 45-65 wt % of said first component.

10. The drywall compound of claim 3, wherein said acetone is present at approximately 32-41 wt % of said first component, said liquid primarily comprising ethyl cyanoacrylate is present at approximately 3-4 wt % of said first component, and said powder primarily comprising calcium sulfate hemihydrate is present at approximately 55-65 wt % of said first component.

11. The drywall compound of claim 3, wherein said acetone is present at approximately 32 wt % of said first component, said liquid primarily comprising ethyl cyanoacrylate is present at approximately 3 wt % of said first component, and said powder primarily comprising calcium sulfate hemihydrate is present at approximately 65 wt % of said first component.

12. The drywall compound of claim 4, wherein said first component is present in said combination at greater than 99 wt % of said drywall compound and said second component is present in said combination at less than 1.0 wt % of the said drywall compound.

13. The drywall compound of claim 4, wherein said acetone is present at approximately 32-45 wt % of said first component, said liquid primarily comprising ethyl cyanoacrylate is present at approximately 3-10 wt % of said first component, and said powder primarily comprising calcium sulfate hemihydrate is present at approximately 45-65 wt % of said first component.

14. The drywall compound of claim 4, wherein said acetone is present at approximately 32-41 wt % of said first component, said liquid primarily comprising ethyl cyanoacrylate is present at approximately 3-4 wt % of said first component, and said powder primarily comprising calcium sulfate hemihydrate is present at approximately 55-65 wt % of said first component.

15. The drywall compound of claim 4, wherein said acetone is present at approximately 32 wt % of said first component, said liquid primarily comprising ethyl cyanoacrylate is present at approximately 3 wt % of said first component, and said powder primarily comprising calcium sulfate hemihydrate is present at approximately 65 wt % of said first component.

16. A method of repairing a defect in a work surface comprising the steps of:
(a) providing a non-aqueous drywall compound comprising the combination of a first component and a second component; said first component comprising the non-aqueous mixture of acetone, a liquid primarily comprising ethyl cyanoacrylate, and a powder primarily comprising calcium sulfate hemihydrate, the mixture being a pliable putty capable of adhering to a surface; said second component comprising a non-aqueous accelerator primarily comprising acetone and further comprising toluene; whereby the combination of said first component and said second cures in less than ten minutes;
(b) mixing said acetone, said liquid primarily comprising ethyl cyanoacrylate, and said powder primarily comprising calcium sulfate hemihydrate whereby said first component is a spreadable putty;
(c) applying said first component to said defect such that an exposed surface is formed on said first component;
(d) applying said second component to said exposed surface of said first component to form said drywall compound;
(e) allowing said drywall compound to cure; and
(f) sanding said drywall compound.

17. The method of claim 16, wherein said step (f) is performed within ten minutes of step (d).

18. The method of claim 16, further comprising the steps of:
(g) applying said first component to said drywall compound such that an exposed surface is formed on said first component;
(h) applying said second component to said exposed surface of said first component applied to said drywall compound in step (g) to form an additional layer of said drywall compound;
(i) allowing said additional layer of said drywall compound to cure; and
(j) sanding said additional layer of said drywall compound; and
(k) repeating steps (g) through (j) as needed to completely fill or cover said defect.

19. The method of claim 18, wherein step (f) is performed within ten minutes of step (d) and step (j) is performed within ten minutes of step (h).

20. A non-aqueous drywall compound comprising the combination of a first component and a second component;
said first component comprising the mixture of (a) acetone, (b) a liquid primarily comprising ethyl cyanoacrylate, and (c) a powder primarily comprising calcium sulfate hemihydrate, said mixture not including water, the mixture being a pliable putty capable of adhering to a surface;
said second component comprising a non-aqueous accelerator primarily comprising acetone and further comprising toluene;
whereby the combination of said first component and said second cures in less than ten minutes.

* * * * *